United States Patent
Petri (10) Patent No.: US 8,069,154 B2
(45) Date of Patent: Nov. 29, 2011

(54) AUTONOMIC RULE GENERATION IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 11/681,845

(22) Filed: Mar. 5, 2007

(65) Prior Publication Data

US 2008/0222183 A1    Sep. 11, 2008

(51) Int. Cl.
G06F 17/00 (2006.01)
(52) U.S. Cl. ........................................ 707/694
(58) Field of Classification Search ................... 707/694
See application file for complete search history.

(56) References Cited

U.S. PATENT DOCUMENTS

| | | | |
|---|---|---|---|
| 4,849,879 A * | 7/1989 | Chinnaswamy et al. | 706/45 |
| 6,725,287 B1 * | 4/2004 | Loeb et al. | 710/8 |
| 6,999,972 B2 * | 2/2006 | Lusen et al. | 1/1 |
| 7,188,107 B2 * | 3/2007 | Moon et al. | 1/1 |
| 7,206,846 B1 * | 4/2007 | Dini et al. | 709/228 |
| 7,380,205 B2 * | 5/2008 | Bezrukov et al. | 715/234 |
| 7,401,320 B2 * | 7/2008 | Brunet et al. | 717/101 |
| 7,490,775 B2 * | 2/2009 | Biderman | 235/472.01 |
| 7,536,370 B2 * | 5/2009 | Masurkar | 706/47 |
| 7,536,715 B2 * | 5/2009 | Markham | 726/11 |
| 7,539,974 B2 * | 5/2009 | Beck et al. | 717/117 |
| 7,676,560 B2 * | 3/2010 | McCollum | 709/223 |
| 7,680,835 B2 * | 3/2010 | MacLaurin et al. | 709/248 |
| 7,712,085 B2 * | 5/2010 | McCollum et al. | 717/130 |
| 7,765,540 B2 * | 7/2010 | McCollum et al. | 717/174 |
| 7,890,936 B2 | 2/2011 | Bates et al. | |
| 2002/0049715 A1 * | 4/2002 | Serrano-Morales et al. | 707/1 |
| 2002/0103661 A1 * | 8/2002 | Albazz et al. | 705/1 |
| 2002/0194251 A1 * | 12/2002 | Richter et al. | 709/105 |
| 2004/0225997 A1 | 11/2004 | Van De Vanter et al. | |
| 2005/0060281 A1 * | 3/2005 | Bucher et al. | 707/1 |
| 2006/0080130 A1 * | 4/2006 | Choksi | 705/1 |

OTHER PUBLICATIONS

XML Application Development Guide, Version 5.2.5, Mar. 2004, Documentum.
Eric Severson, Integrating XML Publishing with a Content Management System: Best Practices, 2003, Flatirons Solutions Corporation.

* cited by examiner

Primary Examiner — Neveen Abel-Jalil
Assistant Examiner — Kellye D Buckingham
(74) Attorney, Agent, or Firm — Martin & Associates, LLC; Derek P. Martin (57) ABSTRACT

A content management system (CMS) includes an autonomic rule generation mechanism that autonomically analyzes existing content and generates rules according to a defined rule generation policy. Autonomically generated rules may include bursting rules, synchronization rules and linking rules. By autonomically generating rules based on the characteristics of content in the repository, the CMS can dramatically improve the ease and efficiency of managing a CMS.

14 Claims, 10 Drawing Sheets

Rule Generation Policy

| | |
|---|---|
| Autonomic Linking Rules | NO |
| Autonomic Synchronization Rules | NO |
| Autonomic Bursting Rules | YES |
| Matching Content for Element | 66 |
| Peers that Meet Matching Content | 50 |
| Target Elements | para |

FIG. 13

| ID | Element | Match |
|---|---|---|
| 1&2 | para | 90% |
| 1&3 | para | 78% |
| 1&4 | para | 56% |
| 2&3 | para | 70% |
| 2&4 | para | 50% |
| 3&4 | para | 67% |

AUTONOMIC RULE GENERATION IN A CONTENT MANAGEMENT SYSTEM

BACKGROUND

1. Technical Field

This disclosure generally relates to content management systems, and more specifically relates to a content management system that autonomically generates rules.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content is checked by the CMS to make sure the content conforms to predefined rules. A user may also check out content from the repository, or link to content in the repository while generating content. The rules in a CMS assure that content to be checked in or linked to meets desired criteria specified in the rules.

Known content management systems check their rules when content is being checked in. If the rule is satisfied, the content is checked into the repository. If the rule is not satisfied, the content is not checked into the repository. Known content management systems may include rules related to bursting, synchronization and linking. Bursting rules govern how a document is bursted, or broken into individual chunks, when the document is checked into the repository. By bursting a document into chunks, the individual chunks may be potentially reused later by a different author. Synchronization rules govern synchronization between content and metadata related to the content. For example, a synchronization rule may specify that whenever a specified CMS attribute is changed, a particular piece of XML in the content should be automatically updated with that attribute's value. Linking rules govern what content in a repository a user may link to in a document that will be subsequently checked into the repository. In a typical CMS, a CMS administrator specifies the rules that apply to documents checked into the repository. As the CMS grows and matures, the CMS administrator typically defines new rules or changes existing rules according to the changes in the CMS. This process of manually generating new rules as conditions in a CMS change is inefficient and prone to human errors. Without a way for a CMS to autonomically generate rules according to content already in the repository, the computer industry will continue to be plagued by the inefficiency of requiring a human CMS administrator to manually specify rules in a CMS.

BRIEF SUMMARY

A content management system (CMS) includes an autonomic rule generation mechanism that autonomically analyzes existing content and generates rules according to a defined rule generation policy. Autonomically generated rules may include bursting rules, synchronization rules and linking rules. By autonomically generating rules based on the characteristics of content in the repository, the CMS can dramatically improve the ease and efficiency of managing a CMS.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a content management system (CMS) that includes an autonomic rule generation mechanism that analyzes content in the repository and autonomically generates one or more rules according to a specified rule generation policy. By autonomically generating rules, the CMS relieves the CMS administrator of the burden of manually generating all rules, and allows the CMS to evolve as the content in the repository increases and changes. The result is a content management system that is much more powerful and flexible than known content management systems.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
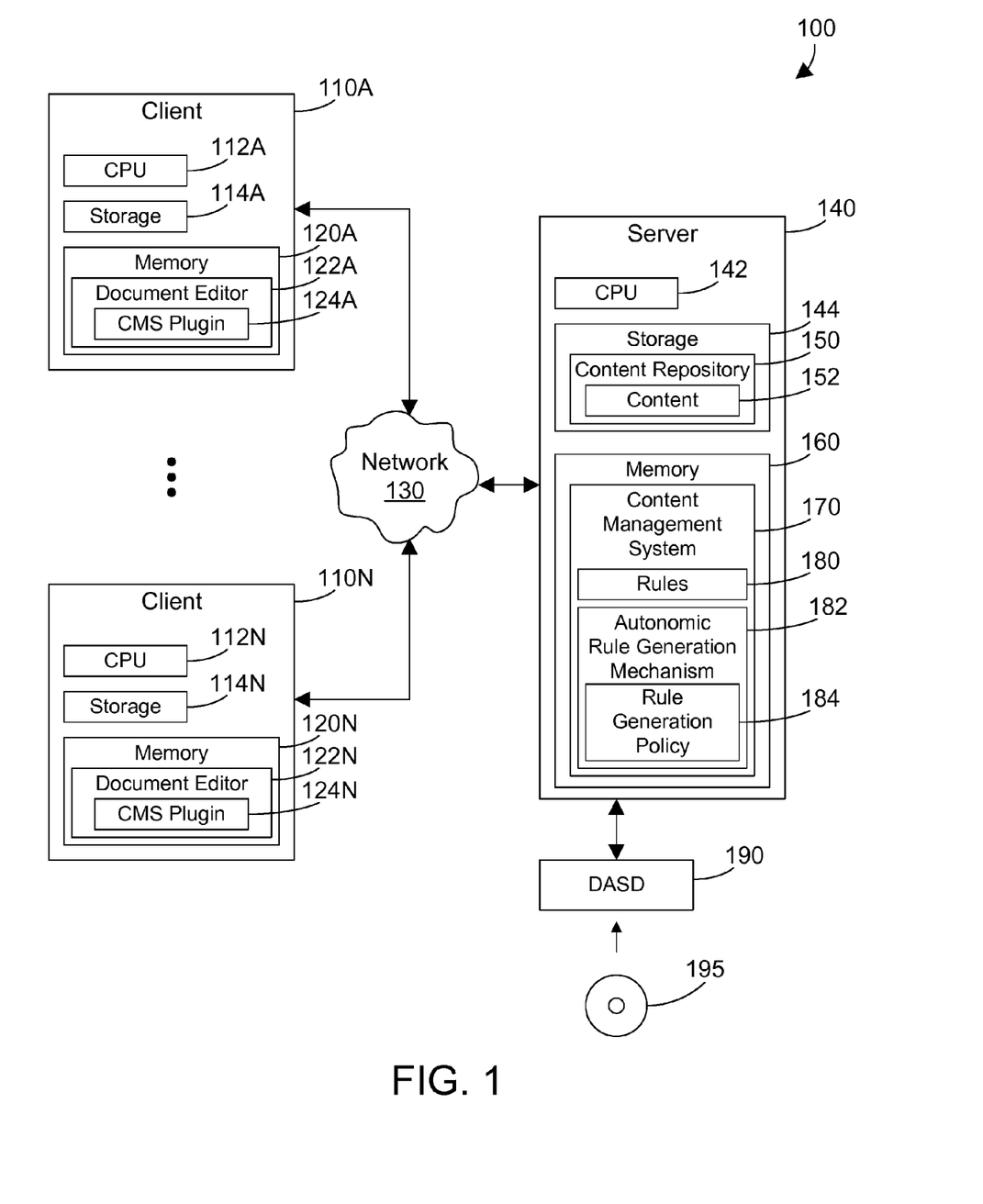
FIG. 1 is a block diagram of a networked computer system that includes a server computer system that has a content management system that includes an autonomic rule generation mechanism that autonomically generates one or more rules based on characteristics of content in the content repository.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes rules 180 and an autonomic rule generation mechanism 182. Autonomic rule generation mechanism 182 analyzes some or all of the content 152 in the repository 150 and may autonomically generate one or more new rules based on a rule generation policy 184. New rules are preferably added to the existing set of rules 180. The rule generation policy 184 specifies one or more criterion that determines when a rule is autonomically created.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
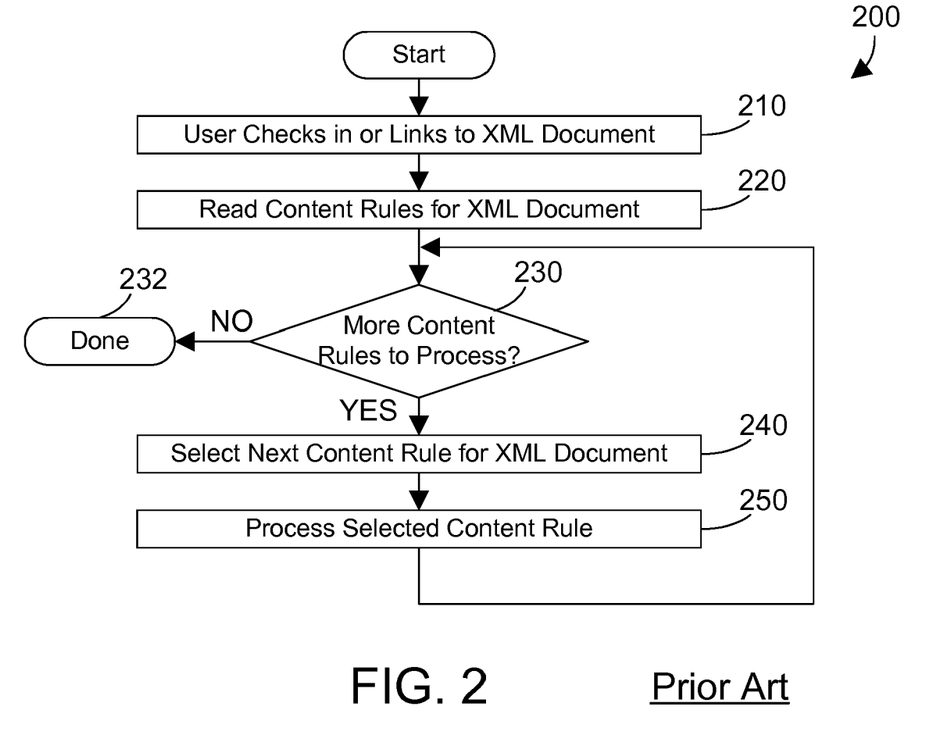
FIG. 2 is a flow diagram of a prior art method for a known content management system.

Referring to FIG. 2, a flow diagram shows a prior art method 200 that is used by known content management systems that handle content in the form of XML documents. Method 200 begins when a user checks in an XML document to the repository, or links to an XML document in the repository (step 210). If there are corresponding content rules for the XML document being checked in or linked to, these content rules are read (step 220). If there are more content rules to process (step 230=YES), the next content rule for the XML document is selected (step 240), and the selected content rule is processed (step 250). Method 200 then loops back to step 230, and if there are more content rules to process (step 230=YES), steps 240 and 250 are repeated for the next content rule, and so on until there are no more content rules to process (step 230=NO), at which point method 200 is done (step 232).

Figure 3:
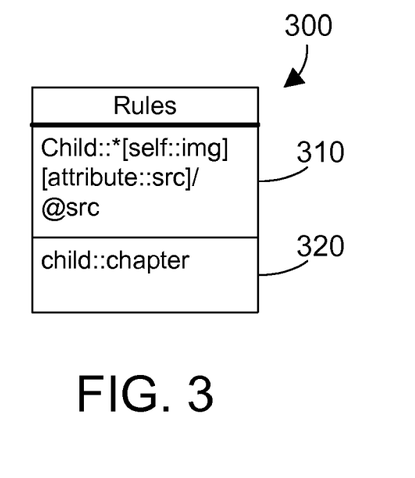
FIG. 3 is a table showing sample rules for a prior art content management system.

Sample content rules similar to those known in the art are shown in table 300 in FIG. 3. These two content rules are Xpath expressions that identify a link/burst location within a source XML document. XPath is a standard mechanism for locating information within an XML document. A simple XPath expression is similar to a file path on a PC for finding a document. In other words, it is used to locate data in the XML from a particular context (such as the root element). For example, /root/title would return the title element that is the child of the root element of an XML document. To understand the example in FIGS. 2-8, linking and bursting in a known CMS needs to be explained. Many content management systems recognize that one way to increase the power of a CMS is to chop content up into smaller chunks that will increase the likelihood that these chunks may be reused for another document. This is known in the art as bursting or chunking. For simplicity herein, we call this bursting, recognizing that different terms apply today to this process and new terms may be developed in the future for this process. When an XML document is checked into a repository controlled by a CMS, the CMS may use rules to determine how to burst the XML document into smaller portions. Bursting requires linking in the original XML document. In essence, an XML document may be dissected up into component chunks (or objects), with each chunk now having its own identity in the repository. Once each chunk has its own identity in the repository, a chunk that was previously in the original XML document may be replaced by a link to the chunk in the repository. We see from this discussion that bursting inherently requires linking, so the content that was bursted may be stored in the repository and that content in the original XML document may be replaced by a link to the chunk in the repository.

Table 300 in FIG. 3 includes two rules 310 and 320. Rule 310 specifies that images identified by the "img" element with a "src" attribute are allowed to be linked or bursted. Rule 310 indicates that in this case the src attribute contains the information that should be extracted by the system when the rule is processed. Rule 320 specifies that content in chapters should be bursted. We assume that content rules 310 and 320 apply to the sample XML document 400 shown in FIG. 4.

Figure 4:
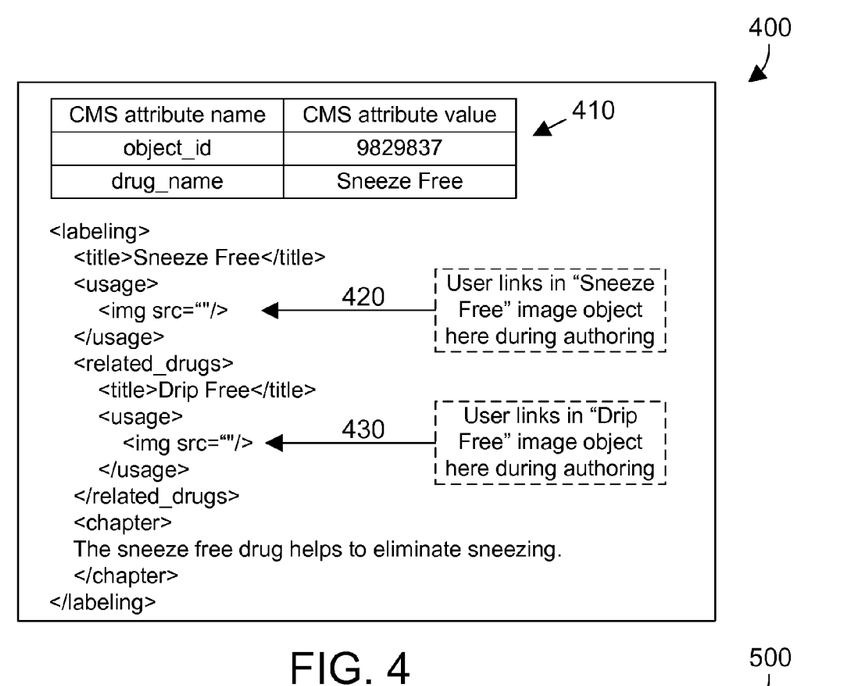
FIG. 4 shows a sample XML document.
Figure 5:
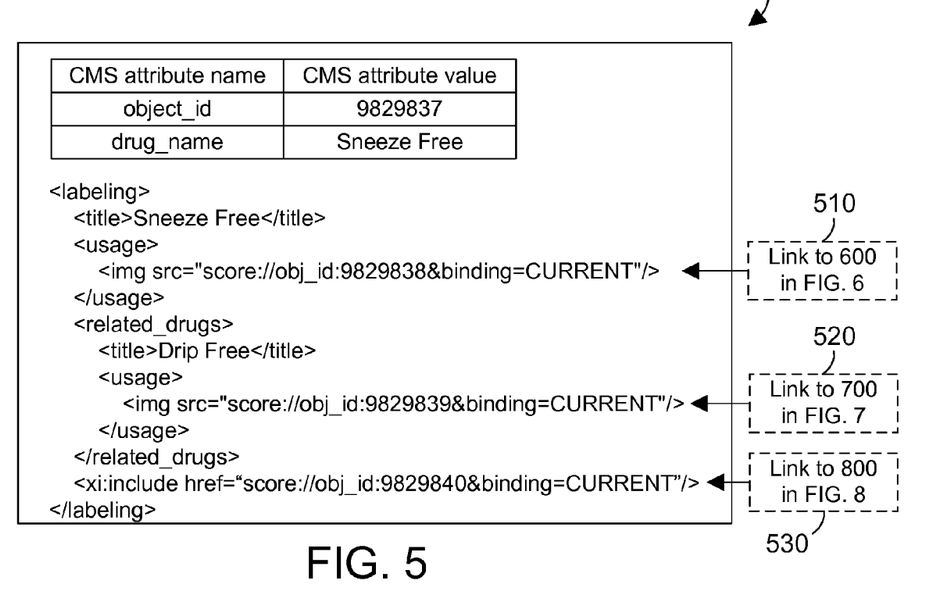
FIG. 5 shows the sample XML document in FIG. 4 after checking the document into the prior art content management system that uses method 200 in FIG. 2 and rules 300 in FIG. 3.
Figure 6:
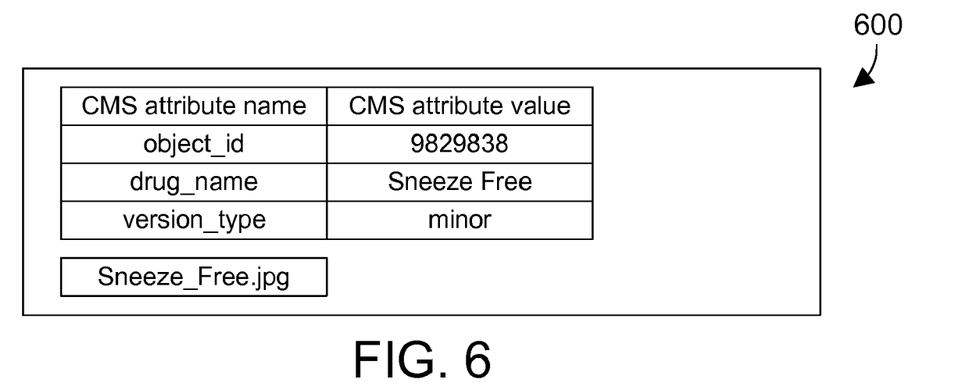
FIG. 6 shows a sample object in a content management system that contains the Sneeze_Free.jpg image.
Figure 7:
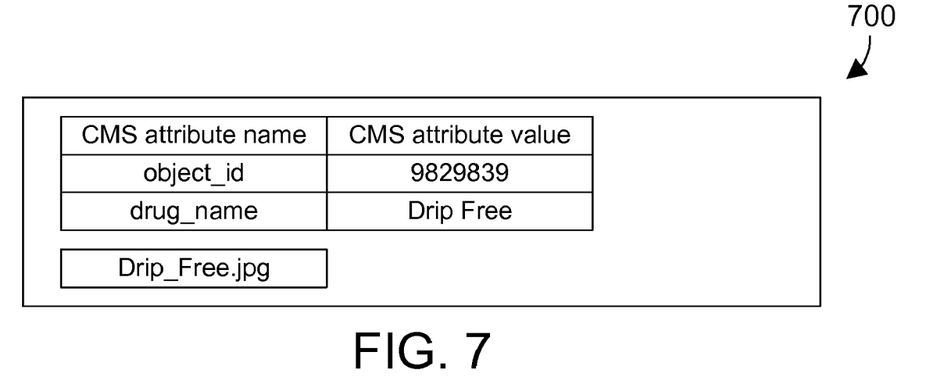
FIG. 7 shows a sample object in a content management system that contains the Drip_Free.jpg image.
Figure 8:
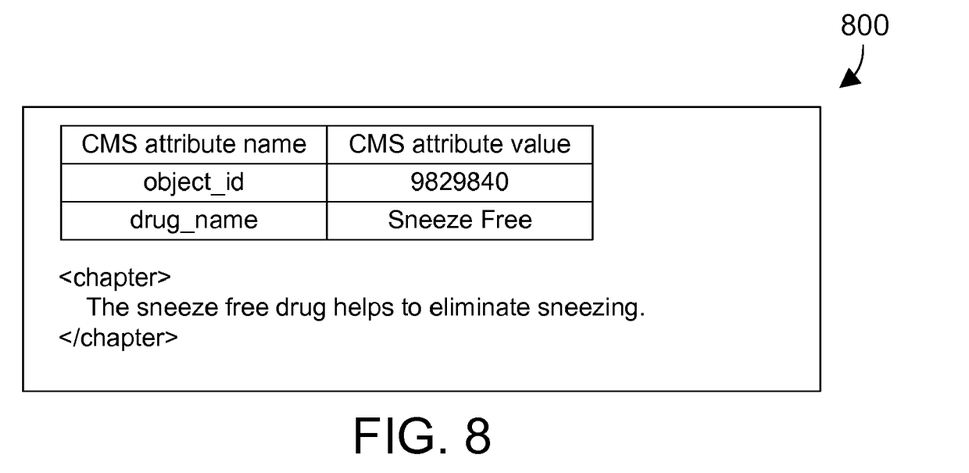
FIG. 8 shows a sample object in a content management system that contains a portion of an XML document.

We now consider the sample XML document 400 in FIG. 4. We assume XML document 400 has been checked into the repository previously, which resulted in the XML document receiving attributes and values in table 410 that uniquely identifies XML document 400 in the repository. The object_id in table 410 is 9829837, which is a unique numerical identifier assigned by the CMS when the object was checked into the repository for the first time. The drug_name in table 410 is Sneeze Free. We now assume a user at a client computer system checks out XML document 400, links in an image object for Sneeze Free at 420, and links in an image object for Drip Free at 430. We assume this document is then checked back into the repository, which causes the CMS to run method 200 in FIG. 2. The content rules 310 and 320 in FIG. 3 are read. As the document is checked in, the rules 310 and 320 are applied to determine how to burst and/or to create links for the document. The result of running rules 310 and 320 against the XML document 400 in FIG. 4 is shown in document 500 in FIG. 5. Rule 310 specifies that images may be linked. We assume the image for Sneeze Free stored in the repository 150 is object 600 shown in FIG. 6. This object includes the object_id of 9829838, a drug_name of Sneeze Free, a version_type of minor, with the image Sneeze_Free.jpg as the image contained in this object. A link to object 600 is then inserted into the XML document, as shown at 510 in FIG. 5. In similar fashion, rule 310 also allows linking of the Drip Free image. The image for Drip Free is stored in the repository 150 as object 700 shown in FIG. 7, and a link to object 700 is inserted in the XML document 500 as shown at 520. Rule 320 requires chapters to be bursted, so the chapter is bursted as object 800 shown in FIG. 8. The object 800 includes the chapter, and the chapter in the XML document 500 is replaced by a link to object 800 at 530 in FIG. 5.

The simple example shown in FIGS. 2-8 illustrate graphically how prior art content management systems apply existing rules when content is checked in or linked to. Note, however, the prior art makes no provision for the autonomic generation of rules according to existing content in the repository.

Figure 9:
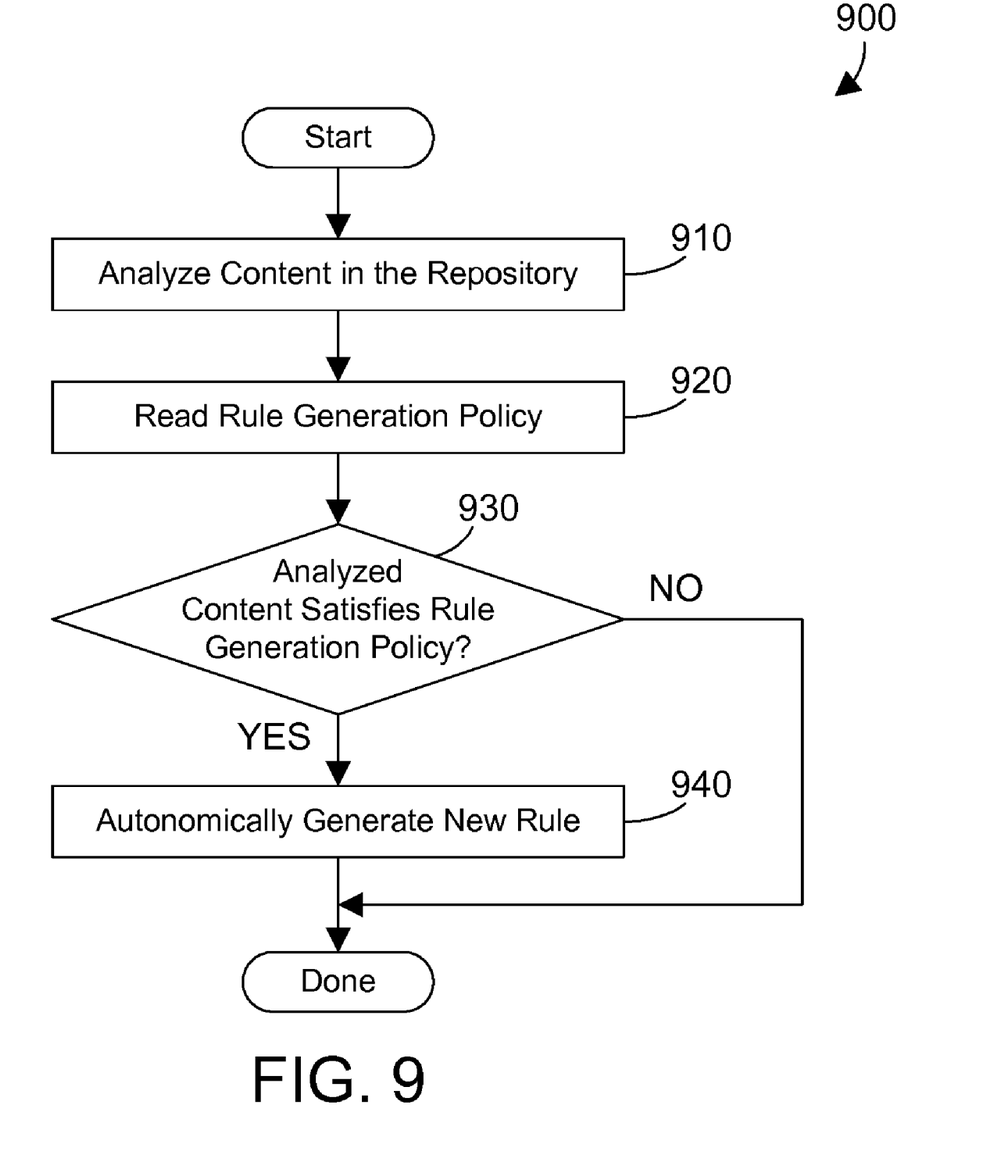
FIG. 9 is a flow diagram of a method for autonomically generating rules in a content management system.

Referring to FIG. 9, a method 900 is preferably performed by the autonomic rule generation mechanism 182 in the content management system 170 shown in FIG. 1. Content in the repository is analyzed (step 910). In the most preferred implementation, a subset of the content in the repository is analyzed, but the disclosure and claims herein expressly extend to analyzing all of the content in the repository. The rule generation policy is read (step 920). If the analyzed content does not satisfy the rule generation policy (step 930=NO), method 900 is done. If the analyzed content satisfies the rule generation policy (step 930=YES), a new rule is autonomically generated (step 940). The new rule generated in step 940 may be a bursting rule, a linking rule, a synchronization rule, or any other suitable type of rule for a content management system, whether currently known or developed in the future. Note that method 900 may be performed at the request of a CMS administrator, and may additionally be performed at periodic intervals. For example, method 900 could be performed once each week at a time when the CMS is the least busy, thereby allowing new rules to be autonomically generated at specified time intervals according to the content in the repository and according to the rule generation policy.

Method 900 in FIG. 9 could optionally include an additional step of applying the new rule to existing content in the repository. The disclosure and claims herein expressly extend to only applying the new rule to new content in a prospective manner, as well as applying the new rule to some or all of the existing content. For example, a new rule could be created, and a schedule could be setup that allows the new rule to be applied incrementally to all of the existing content in the repository. Thus, after creation of a new rule, the new rule could be applied to all new content that is checked in, and may also be applied to 10% of the existing content in the repository each day for the next ten days. Other methods may be devised to apply the new rule to existing content, all of which are within the scope of the disclosure and claims herein.

Figure 10:
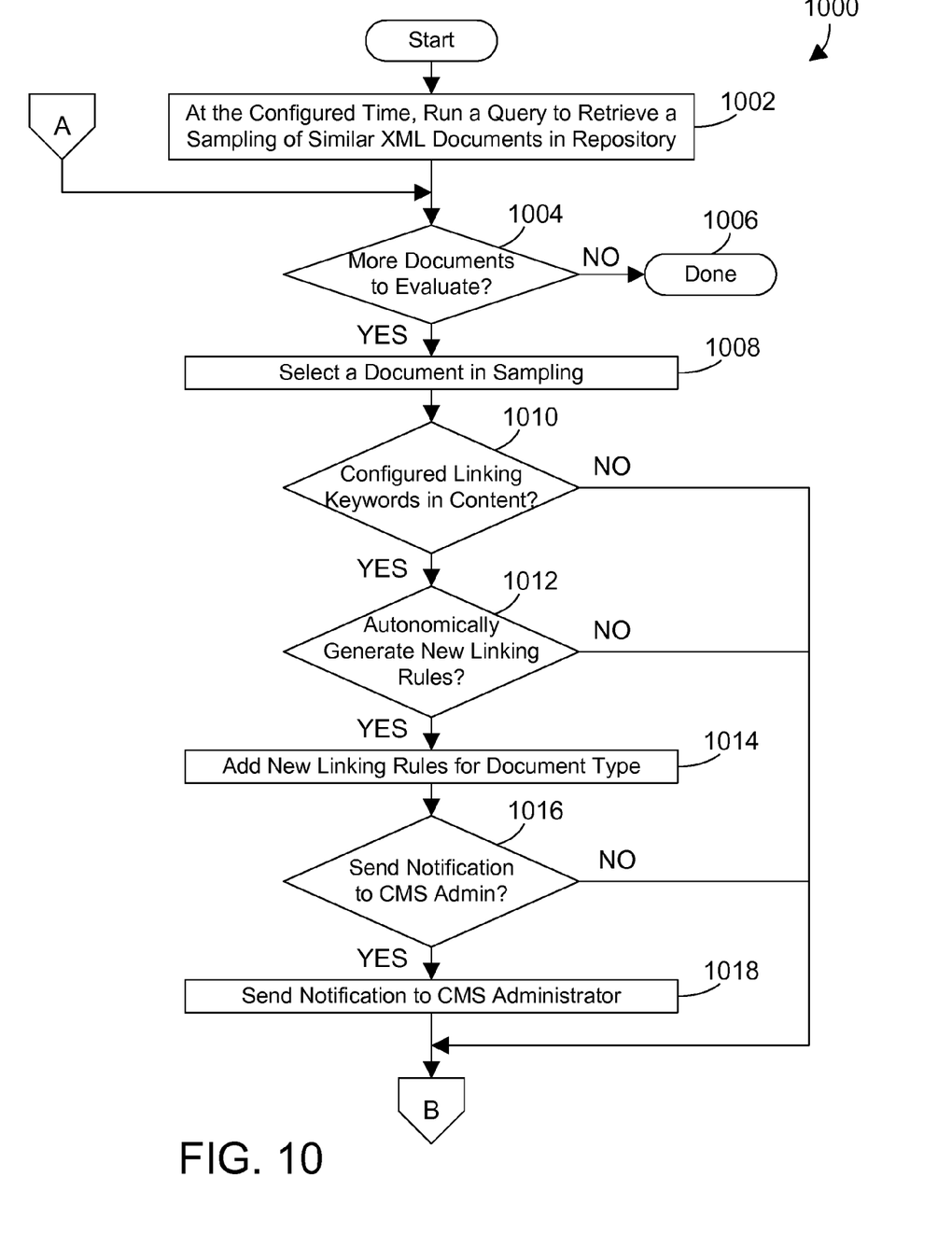
FIGS. 10-12 together comprise a flow diagram of a specific method that is one suitable example for the general method shown in FIG. 9.
Figure 11:
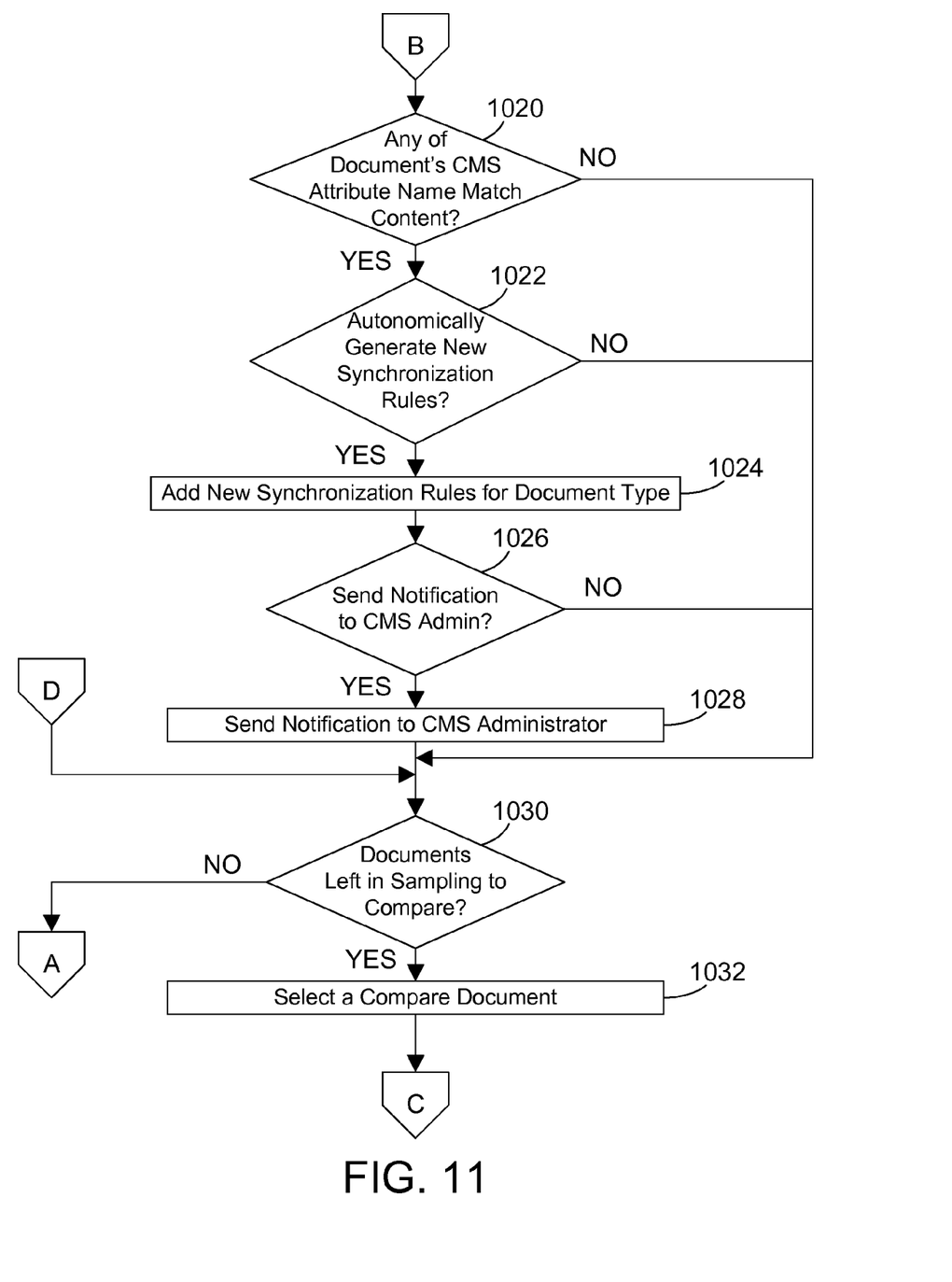
Figure 12:
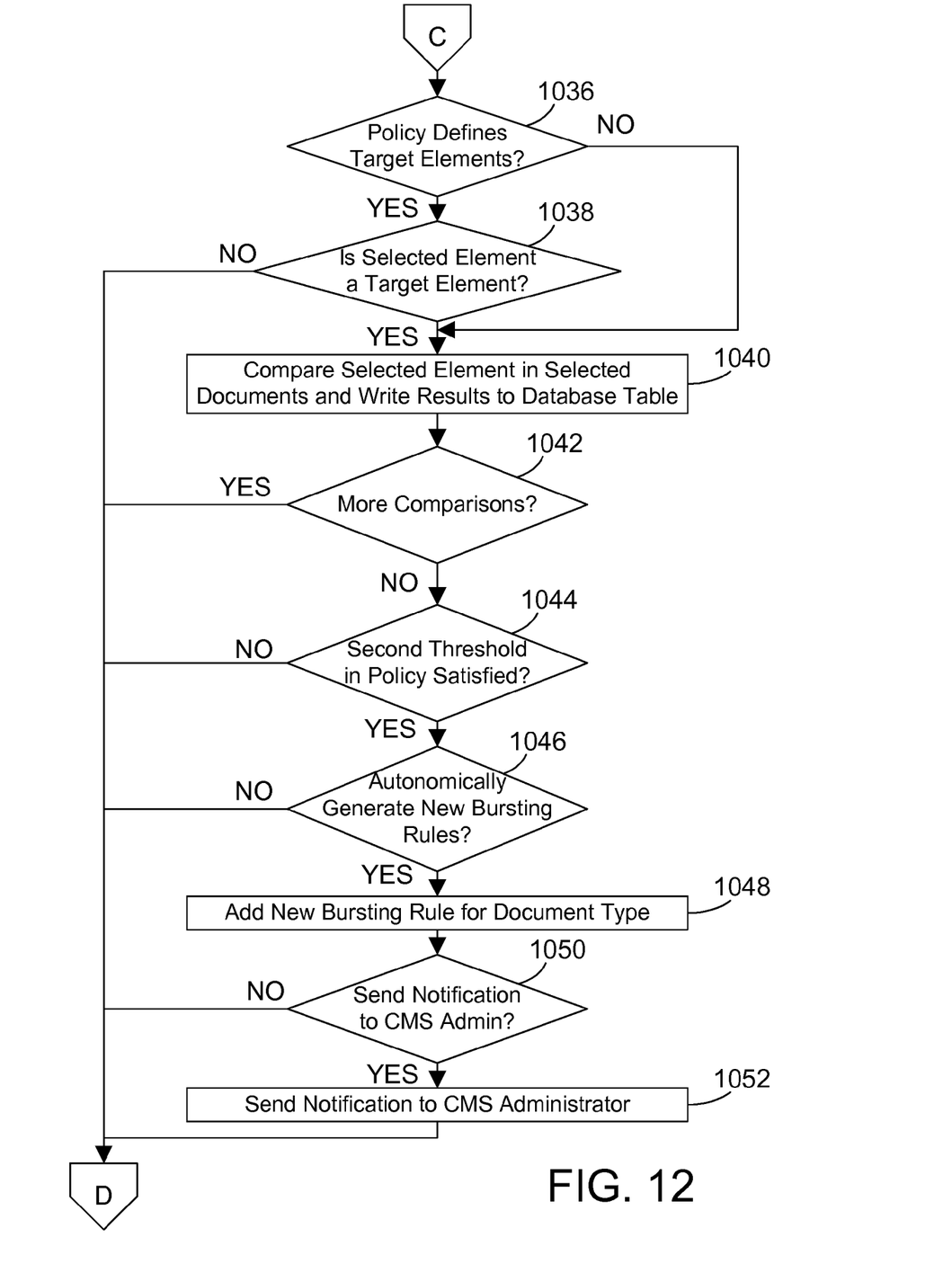

FIGS. 10-12 illustrate a method 1000 that spans these three figures, with the various markers A, B, C and D indicating connections to a different page. Method 1000 is one specific implementation of method 900 in FIG. 9 within the scope of the disclosure and claims herein. Method 1000 assumes the content 152 in the repository 150 is in the form of XML documents. We assume method 1000 is executed at the request of a CMS administrator, or at periodic intervals, as discussed above. At the configured time, a query is run on the content in the repository to retrieve a sampling of similar XML documents (step 1002). The sampling of documents may be based, for example, on document type. Because there are more documents to evaluate (step 1004=YES), one of the documents in the sampling is selected (step 1008). If there is one or more configured linking keywords in the content of the selected document (step 1010=YES), and if the rule generation policy specifies to autonomically generate new linking rules (step 1012=YES), one or more new linking rules for the document type are added (step 1014). If a notification needs to be sent to the CMS administrator (step 1016=YES), the notification is sent (step 1018). If the selected document has no configured linking keywords (step 1010=NO), or if the rule generation policy specifies to not create new linking rules (step 1012=NO), no new linking rules are generated, and control passes to marker B at the bottom of FIG. 10. Likewise, if no notification to the CMS administrator is required (step 1016=NO), control passes to marker B, which is shown at the top of FIG. 11.

Referring to FIG. 11, method 1000 then determines whether any of the selected document's CMS attribute names match the content in the selected document (step 1020). If so (step 1020=YES), and if the rule generation policy specifies to autonomically generate new synchronization rules (step 1022=YES), one or more new synchronization rules for the document type are autonomically generated (step 1024). If a notification needs to be sent to the CMS administrator (step 1026=YES), the notification is sent (step 1028). If the selected document does not have attribute names that match its content (step 1020=NO), or if the rule generation policy specifies not to create new synchronization rules (step 1022=NO), no new synchronization rules are generated, and control passes to step 1030. Likewise, if no notification to the CMS administrator is required (step 1026=NO), control passes to step 1030.

Step 1030 determines whether there are more documents in the sampling left to compare against the selected document. If not (step 1030=NO), control passes to marker A, which is shown near the top of FIG. 10. If there are more documents in the sampling to evaluate (step 1004=YES), method 1000 proceeds to select another document (step 1008) and continues. If there are no more documents in the sampling to evaluate (step 1004=NO), method 1000 is done (step 1006).

Returning to FIG. 11, if there are documents left in the sampling to compare to the selected document (step 1030=YES), one of the documents is selected as the compare document (step 1032). Control then passes to marker C, which is shown at the top of the page in FIG. 12. We assume for method 1000 that a single element is selected for bursting analysis in the flow in FIG. 12. If the rule generation policy defines target elements (step 1036=YES), and if the selected element is a target element (step 1038=YES), the selected element in the selected document is compared with the selected element in the selected compared document, and the result is written to a database table (step 1040). Target elements could be specified in the rule generation policy, effectively narrowing the scope of autonomic rule generation to those specified target elements. The specification of target elements could make the autonomic rule generation more efficient for the target elements. If the policy does not define target elements (step 1036=NO), all elements are candidates for comparison, so the selected element in the selected document is compared with the selected element in the selected compared document, and the result is written to the database table (step 1040). If the rule generation policy defines target elements (step 1036=YES) but the selected element is not a target element (step 1038=NO), control passes to marker D in FIG. 11.

Once the selected element in the two selected documents has been compared in step 1040, we now determine whether a bursting rule may be autonomically generated for the selected element. If there are more comparisons to perform (step 1042=YES), control passes to marker D in FIG. 11. Once all comparisons have been performed (step 1042=NO), method 1000 determines whether the second threshold in the rule generation policy has been satisfied (step 1044). The rule generation policy preferably specifies two thresholds. The first threshold in the rule generation policy specifies how similar two documents must be for them to "match." The second threshold in the rule generation policy specifies how many or what percentage of comparisons of the documents in the sampling must match the first threshold specified in the rule generation policy for a new rule to be autonomically generated. For example, if the first threshold is 66% and the second threshold is 50% for a particular element, this means two documents being compared must be 66% or more similar to be considered a match, and 50% or more of the comparisons of documents in the sampling must match (i.e., satisfy the first threshold) for a rule to be autonomically generated. If the selected element in the two documents does not satisfy the second threshold in the rule generation policy (step 1044=NO), control passes to marker D in FIG. 11. If the second threshold in the rule generation policy is satisfied (step 1044=YES), which indicates that a sufficient number or percentage of document comparisons in the sampling meet the first threshold, and if the rule generation policy specifies autonomic generation of new bursting rules (step 1046=YES), a new bursting rule is autonomically generated for the document type (step 1048). If the second threshold in the rule generation policy is not satisfied (step 1044=NO), or if the rule generation policy does not allow autonomic generation of bursting rules (step 1046=NO), control passes to marker D in FIG. 11. After autonomically adding a new bursting rule in step 1048, if a notification of the new rule needs to be sent to a CMS administrator (step 1050=YES), the notification is sent (step 1052), and control passes to marker D in FIG. 11. If no notification to the CMS administrator is needed (step 1050=NO), control passes to marker D in FIG. 11.

Figure 13:
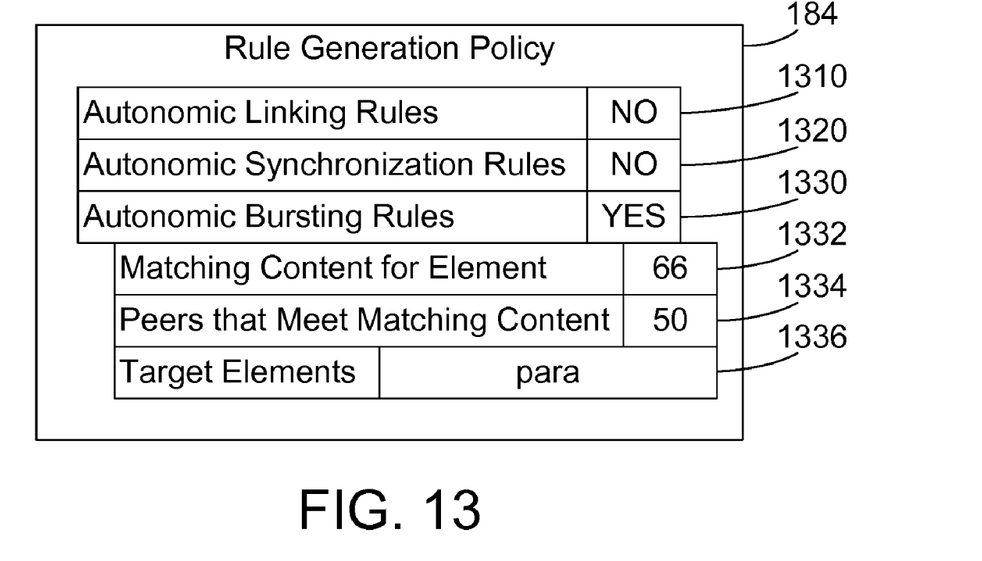
FIG. 13 is a table showing a sample rule generation policy.

A simple example is now presented to illustrate the general concepts of method 900 in FIG. 9 and method 1000 in FIGS. 10-12. A sample rule generation policy 1300 is shown in FIG. 13. Rule 1300 is one suitable example of rule generation policy 184 in FIG. 1. Rule generation policy 1300 specifies that linking rules are not autonomically generated in entry 1310, that synchronization rules are not autonomically generated in entry 1320, and that bursting rules are autonomically generated in step 1330. In addition, two different thresholds (discussed above) are specified in entries 1332 and 1334 that relate to the autonomic generation of bursting rules. The first entry 1332 specifies a first percentage threshold of 66, which means 66% or more of two elements must be similar for the two elements to match. The second entry 1334 specifies a second percentage threshold of 50, which means 50% of the documents in the sampling must match (i.e., must meet the threshold specified in entry 1332) for a rule to be autonomically generated for the element. Entry 1336 specifies a target entry of "para", indicating the specified policy for bursting only applies to paragraph elements that have the designation "para." If both thresholds in 1332 and 1334 are satisfied for a paragraph element, and if autonomic bursting of rules is allowed in entry 1330, a bursting rule is autonomically generated for the paragraph element.

Figure 16:
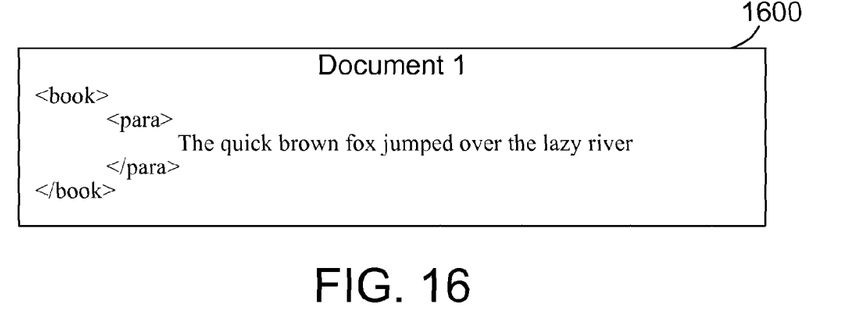
FIG. 16 shows a first sample document in a sampling of documents in a CMS repository.
Figure 17:
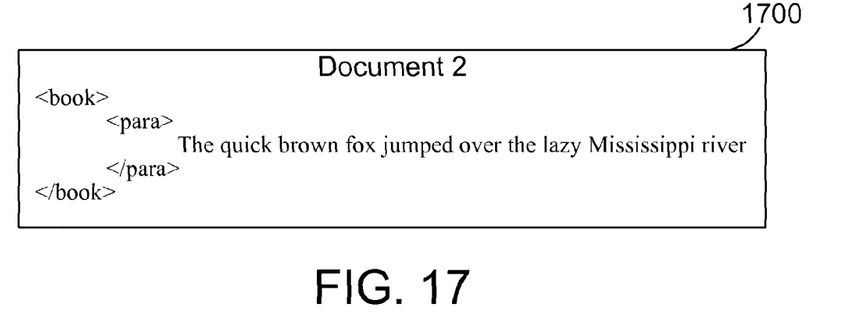
FIG. 17 shows a second sample document in the sampling of documents.

We now assume a sampling of documents includes the four documents 1600, 1700, 1800 and 1900 shown in FIGS. 16-19, respectively. We assume the sampling is a sample of all book documents in the repository. Each of these documents is assumed to have a table similar to 410 in FIG. 4 that specifies metadata for the document that may be used by CMS 170. The metadata is not shown in FIGS. 16-19 for the sake of clarity. We will now go through the detailed steps of method 1000 in FIGS. 10-12 to show how this method results in the autonomic generation of a bursting rule. We assume the configured time to run method 1000 has arrived, be it by a CMS administrator requesting that method 1000 be performed, or by a timer kicking off method 1000 at periodic intervals. We assume step 1002 retrieves the four sample documents shown in FIGS. 16-19. None of these have been evaluated yet (step 1004=YES), so one of the documents in the sampling is selected (step 1008). We assume Document 1600 in FIG. 16 is selected in step 1008. There are no configured linking keywords in the content of document 1600 (step 1010=NO), so control passes to marker B in FIG. 11. We assume for this simplified example that none of the CMS attribute names of document 1600 match the content (step 1020=NO), so control passes to step 1030. The selected document 1600 has not yet been compared to any of the other documents in the sampling, so there are still documents in the sampling left to compare (step 1030=YES). A compare document is selected (step 1032). We assume document 1700 in FIG. 17 is selected as the compare document in step 1032. Control now passes to marker C in FIG. 12.

Figure 14:
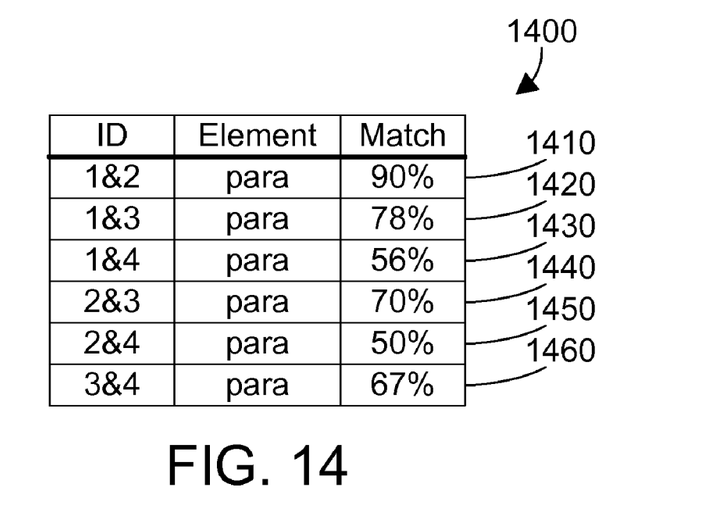
FIG. 14 is a table showing the results of comparing the content in the sample documents shown in FIGS. 16-19.

We assume the paragraph element is the selected element that is analyzed using the steps in FIG. 12. The sample rule generation policy 1300 in FIG. 13 defines target elements (step 1036=YES), and the selected paragraph element is a target element (step 1038=YES), as shown in entry 1336 in FIG. 13. As a result, the paragraph element in selected document 1600 in FIG. 16 is compared with the paragraph element in the selected compare document 1700 in FIG. 17, and the results are written as entry 1410 in database table 1400 in FIG. 14 (step 1040). We see that of the ten words in the paragraph in document 1800, nine of them match the paragraph in document 1700, resulting in a 90% match as shown in entry 1410 in FIG. 14.

Figure 18:
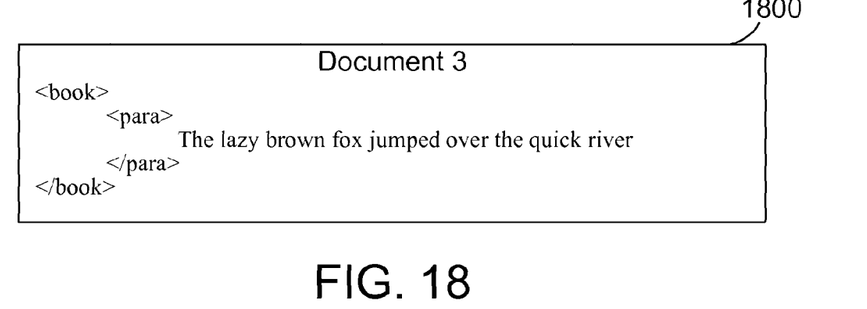
FIG. 18 shows a third sample document in the sampling of documents.
Figure 19:
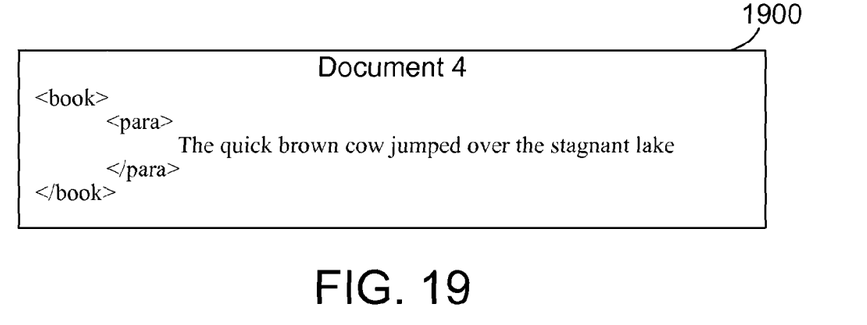
FIG. 19 shows a fourth sample document in a sampling of documents.

Next, method 1000 determines whether there are more comparisons to perform (step 1042). Because there remain other comparisons to perform (step 1042=YES), control passes to marker D in FIG. 11. There are still documents, namely documents 1800 in FIGS. 18 and 1900 in FIG. 19, to compare with the selected document 1600 in FIG. 16 (step 1030=YES), so the next document 1800 in FIG. 18 is selected as the compare document (step 1032), and control passes to marker C in FIG. 12. For document 1800 in FIG. 18, steps 1036=YES, 1038=YES, and the comparison in step 1040 produces entry 1420 in FIG. 14. There are still more comparisons to perform (step 1042=YES), so control passes to marker D in FIG. 11. There is still a document in the sampling, namely document 1900 in FIG. 19, that has not been compared (step 1030=YES), so document 1900 in FIG. 19 is selected (step 1032), and control passes to marker C in FIG. 12. For document 1900, step 1036=YES and step 1038=YES, so the paragraph element in document 1900 is compared with the paragraph element in document 1600, and the result is written to the database table at entry 1430 in FIG. 14. There are still comparisons to perform (step 1042=YES), so control passes to marker D in FIG. 11. There are no more documents in the sampling to compare against the selected document 1600 in FIG. 16 (step 1030=NO), so control passes to marker A in FIG. 10.

There are more documents to evaluate (step 1004=YES), so the next document in the sampling, namely document 1700 in FIG. 17, is selected (step 1008). There are no configured linking keywords in the content (step 1010=NO), so control passes to marker B in FIG. 11. We assume none of the CMS attribute names match the content (step 1020=NO), so control passes to step 1030. There are still documents left in the sampling to compare (step 1030=YES), so document 1800 is selected as the compare document (step 1032), and control passes to marker C in FIG. 12. Step 1036=YES and 1038=YES, so the paragraph element in document 1800 is compared with the paragraph element in document 1700, and the result is written as entry 1440 in FIG. 14. There are still comparisons to be performed (step 1042=YES), so control passes to marker D in FIG. 11. There is still a document, namely 1900, left to compare with document 1700 (step 1030=YES), so document 1900 is selected as the compare document (step 1032), and control passes to marker C in FIG. 12. Step 1036=YES and step 1038=YES, so the paragraph element in document 1900 is compared with the paragraph element in document 1700, with the results being written to entry 1450 in FIG. 14 (step 1040). There is still one more comparison to perform (step 1042=YES), so control passes to marker D in FIG. 11. There are no more documents in the sampling to compare with the selected document 1700 (step 1300=NO), so control passes to marker A in FIG. 10.

Figure 15:
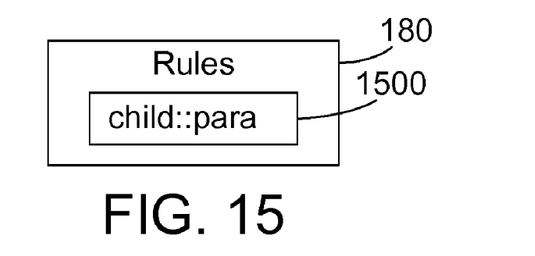
FIG. 15 shows the new bursting rule that was autonomically generated by analyzing the sample documents shown in FIGS. 16-19 using method 1000 shown in FIGS. 10-12 and the sample rule generation policy in FIG. 13.

There are still more documents to evaluate (step 1004=YES), so the next document in the sampling, namely document 1800, is selected (step 1008). There are no configured linking keywords in the content (step 1010=NO), so control passes to marker B in FIG. 11. We assume that none of the CMS attribute names of document 1800 match the content (step 1020=NO). There is still a document in the sampling left to compare with the selected document 1800 (step 1030=YES), so document 1900 is selected as the compare document (step 1032), and control passes to marker C in FIG. 12. Step 1036=YES and step 1038=YES, so the paragraph element in document 1900 is compared with the paragraph element in document 1800, and the results are written to entry 1460 in FIG. 14 (step 1040). At this point, all needed comparisons have been performed (step 1042=NO), so method 1000 determines whether the second threshold in the rule generation policy is satisfied (step 1044). We see from table 1400 in FIG. 14 that there are six total comparisons. Table 1400 shows that documents 1 and 2 have a 90% match; documents 1 and 3 have a 78% match; documents 1 and 4 have a 56% match; documents 2 and 3 have a 70% match; documents 2 and 4 have a 50% match; and documents 3 and 4 have a 67% match. The first threshold at entry 1332 in the rule generation policy 1300 in FIG. 13 specifies elements must have 66% content matching (first threshold), and entry 1334 specifies a second threshold of 50%, which means 50% of the documents in a sampling must have 66% or more of their content matching in order to autonomically generate a new bursting rule. We see from table 1400 that four of the six comparisons meet or exceed the specified 66% first threshold, which means that over 50% of the comparisons match, so the second threshold is satisfied (step 1044=YES). The rule generation policy specifies to autonomically generate new bursting rules at 1330 in FIG. 13 (step 1046=YES). As a result, a new bursting rule is added (step 1048). The new bursting rule is shown at 1500 in FIG. 15, which specifies to burst paragraph elements when a document is checked into the repository. Note this rule is shown by way of example, and a rule with a different XPath expression, such as /book/para, would accomplish the same result of bursting the paragraph elements.

The ability to autonomically generate rules based on content in the repository in a CMS increases the power and flexibility of the CMS. The rule generation policy gives a CMS administrator the ability to determine when and how rules are autonomically generated by the autonomic rule generation mechanism.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
    at least one processor;
    a memory coupled to the at least one processor;
    a repository of content in the memory; and
    a content management system residing in the memory and executed by the at least one processor, the content management system comprising:
        a plurality of rules that must be satisfied for the content to be checked into the repository, each rule specifying at least one criterion related to the content in the repository;
        a rule generation policy that specifies at least one criterion for autonomically generating a new linking rule that is one of the plurality of rules, at least one criterion for autonomically generating a new synchronization rule that is one of the plurality of rules, and at least one criterion for autonomically generating a new bursting rule that is one of the plurality of rules, the at least one criterion for autonomically generating the new linking rule comprising a first threshold for matching content for a first specified element and a second threshold for number of comparisons of documents in a first sample from the repository that satisfy the first threshold, the at least one criterion for autonomically generating the new synchronization rule comprising a third threshold for matching content for a second specified element and a fourth threshold for number of comparisons of documents in a second sample from the repository that satisfy the third threshold, the at least one criterion for autonomically generating the new bursting rule comprising a fifth threshold for matching content for a third specified element and a sixth threshold for number of comparisons of documents in a third sample from the repository that satisfy the fifth threshold; and
        an autonomic rule generation mechanism that analyzes content in the repository and autonomically generates the new bursting rule when the analyzed content satisfies the at least one criterion for autonomically generating the new bursting rule in the rule generation policy.

2. The apparatus of claim 1 wherein the autonomic rule generation mechanism autonomically generates the new linking rule when the analyzed content satisfies the at least one criterion for autonomically generating the new linking rule in the rule generation policy.

3. The apparatus of claim 1 wherein the autonomic rule generation mechanism autonomically generates the new synchronization rule when the analyzed content satisfies the at least one criterion for autonomically generating the new synchronization rule in the rule generation policy.

4. A computer-implemented method for autonomically generating a new rule related to content in a repository in a content management system, the method comprising the steps of:
    (A) providing at least one processor;
    (B) providing a memory coupled to the at least one processor;
    (C) analyzing content in the repository;
    (D) reading a rule generation policy that specifies at least one criterion for autonomically generating a new linking rule, at least one criterion for autonomically generating a new synchronization rule, and at least one criterion for autonomically generating a new bursting rule, the at least one criterion for autonomically generating the new linking rule comprising a first threshold for matching content for a first specified element and a second threshold for number of comparisons of documents in a first sample from the repository that satisfy the first threshold, the at least one criterion for autonomically generating the new synchronization rule comprising a third threshold for matching content for a second specified element and a fourth threshold for number of comparisons of documents in a second sample from the repository that satisfy the third threshold, the at least one criterion for autonomically generating the new bursting rule comprising a fifth threshold for matching content for a third specified element and a sixth threshold for number of comparisons of documents in a third sample from the repository that satisfy the fifth threshold;
    (E) determining whether the analyzed content satisfies the at least one criterion for autonomically generating the new bursting rule in the rule generation policy; and
    (F) autonomically generating the new bursting rule for the content management system when the content satisfies the at least one criterion for autonomically generating the new bursting rule in the rule generation policy.

5. The method of claim 4 further comprising the step of performing steps (C) through (F) at defined time intervals.

6. The method of claim 4 further comprising the step of performing steps (C) through (F) at the request of an administrator.

7. The method of claim 4 wherein the content analyzed in step (C) comprises a subset of the content in the repository.

8. The method of claim 4 further comprising the steps of:
    (G) determining whether the analyzed content satisfies the at least one criterion for autonomically generating the new linking rule in the rule generation policy; and
    (H) autonomically generating the new linking rule for the content management system when the content satisfies the at least one criterion for autonomically generating the new linking rule in the rule generation policy.

9. The method of claim 4 further comprising the steps of:
(G) determining whether the analyzed content satisfies the at least one criterion for autonomically generating the new synchronization rule in the rule generation policy; and
(H) autonomically generating the new synchronization rule for the content management system when the content satisfies the at least one criterion for autonomically generating the new synchronization rule in the rule generation policy.

10. A method for deploying computing infrastructure, comprising integrating computer readable code into a computing system, wherein the code in combination with the computing system perform the method of claim 4.

11. A computer-implemented method for autonomically generating a plurality of new rules related to content in a repository in a content management system, the method comprising the steps of:
(A) providing at least one processor;
(B) providing a memory coupled to the at least one processor;
(C) analyzing content in the repository;
(D) reading a rule generation policy that specifies at least one criterion for autonomically generating a new linking rule, at least one criterion for autonomically generating a new synchronization rule, and at least one criterion for autonomically generating a new bursting rule, the at least one criterion for autonomically generating the new linking rule comprising a first threshold for matching content for a first specified element and a second threshold for number of comparisons of documents in a first sample from the repository that satisfy the first threshold, the at least one criterion for autonomically generating the new synchronization rule comprising a third threshold for matching content for a second specified element and a fourth threshold for number of comparisons of documents in a second sample from the repository that satisfy the third threshold, the at least one criterion for autonomically generating the new bursting rule comprising a fifth threshold for matching content for a third specified element and a sixth threshold for number of comparisons of documents in a third sample from the repository that satisfy the fifth threshold;
(E) determining whether the analyzed content satisfies the at least one criterion for autonomically generating a new linking rule in the rule generation policy;
(F) autonomically generating a new linking rule for the content management system when the content satisfies at least one criterion for autonomically generating a new linking rule in the rule generation policy;
(G) determining whether the analyzed content satisfies the at least one criterion for autonomically generating a new synchronization rule in the rule generation policy;
(H) autonomically generating a new synchronization rule for the content management system when the content satisfies at least one criterion for autonomically generating a new synchronization rule in the rule generation policy;
(I) determining whether the analyzed content satisfies the at least one criterion for autonomically generating a new bursting rule in the rule generation policy; and
(J) autonomically generating a new bursting rule for the content management system when the content satisfies at least one criterion for autonomically generating a new bursting rule in the rule generation policy.

12. An article of manufacture comprising executable software stored on recordable media, the software comprising:
a content management system comprising:
a plurality of rules that must be satisfied for content to be checked into the repository, each rule specifying at least one criterion related to content in a repository;
a rule generation policy that specifies at least one criterion for autonomically generating a new linking rule that is one of the plurality of rules, at least one criterion for autonomically generating a new synchronization rule that is one of the plurality of rules, and at least one criterion for autonomically generating a new bursting rule that is one of the plurality of rules, the at least one criterion for autonomically generating the new linking rule comprising a first threshold for matching content for a first specified element and a second threshold for number of comparisons of documents in a first sample from the repository that satisfy the first threshold, the at least one criterion for autonomically generating the new synchronization rule comprising a third threshold for matching content for a second specified element and a fourth threshold for number of comparisons of documents in a second sample from the repository that satisfy the third threshold, the at least one criterion for autonomically generating the new bursting rule comprising a fifth threshold for matching content for a third specified element and a sixth threshold for number of comparisons of documents in a third sample from the repository that satisfy the fifth threshold;
an autonomic rule generation mechanism that analyzes content in the repository and autonomically generates the new bursting rule when the analyzed content satisfies the at least one criterion for autonomically generating the new bursting rule in the rule generation policy.

13. The article of manufacture of claim 12 wherein the autonomic rule generation mechanism autonomically generates the new linking rule when the analyzed content satisfies the at least one criterion for autonomically generating the new linking rule in the rule generation policy.

14. The article of manufacture of claim 12 wherein the autonomic rule generation mechanism autonomically generates the new synchronization rule when the analyzed content satisfies the at least one criterion for autonomically generating the new synchronization rule in the rule generation policy.

* * * * *